US012276158B2

(12) United States Patent
Menendez et al.

(10) Patent No.: US 12,276,158 B2
(45) Date of Patent: Apr. 15, 2025

(54) SYSTEM AND METHOD FOR CONTROLLING ONE OR MORE ROLLER SHADES

(71) Applicant: Crestron Electronics, Inc., Rockleigh, NJ (US)

(72) Inventors: Victor M. Menendez, Carrollton, TX (US); Benjamin M. Slivka, Hillsdale, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 203 days.

(21) Appl. No.: 18/057,055

(22) Filed: Nov. 18, 2022

(65) Prior Publication Data

US 2023/0151690 A1 May 18, 2023

Related U.S. Application Data

(60) Provisional application No. 63/280,871, filed on Nov. 18, 2021.

(51) Int. Cl.
*E06B 9/72* (2006.01)
*E06B 9/68* (2006.01)

(52) U.S. Cl.
CPC ........ *E06B 9/72* (2013.01); *E06B 2009/6845* (2013.01); *E06B 2009/6872* (2013.01)

(58) Field of Classification Search
CPC .................................. G05B 19/19; E06B 9/32
See application file for complete search history.

(56) References Cited

U.S. PATENT DOCUMENTS

| | | | |
|---|---|---|---|
| 4,017,036 | A | 4/1977 | Bates |
| 6,369,530 | B2 | 4/2002 | Kovach et al. |
| 7,091,682 | B2 | 8/2006 | Walker |
| 7,281,565 | B2 | 10/2007 | Carmen, Jr. et al. |
| 7,346,272 | B2 | 3/2008 | Franzan |
| 7,537,040 | B2 | 5/2009 | Carmen, Jr. et al. |
| 7,635,018 | B2 | 12/2009 | Carmen, Jr. et al. |
| 8,125,167 | B1 | 2/2012 | Mullet et al. |
| 8,339,085 | B2 | 12/2012 | Feldstein et al. |
| 8,339,086 | B2 | 12/2012 | Feldstein et al. |
| 8,350,513 | B2 | 1/2013 | Feldstein et al. |
| 8,368,335 | B2 | 2/2013 | Feldstein et al. |

(Continued)

OTHER PUBLICATIONS

U.S. Appl. No. 61/648,011 to Colson et al. (Year: 2013).*

*Primary Examiner* — Said Bouziane
(74) *Attorney, Agent, or Firm* — Crestron Electronics, Inc.

(57) ABSTRACT

Systems, methods, and modes for controlling one or more roller shades in order to substantially synchronize and uniformly align a plurality of roller shades. Each shade comprises a roller tube, a shade material connected to the roller tube, a motor adapted to rotate the roller tube, and a controller. The controller is adapted to: drive the motor between a first limit position and a second limit position of the shade material at a first rotational speed; determine a run time it took the motor to move the shade material between the first limit position and the second limit position; using at least the determined run time, determine a second rotational speed for the controller to drive the motor between the first limit position and the second limit position within a predetermined run time; and set the motor to operate according to the second rotational speed.

25 Claims, 5 Drawing Sheets

(56) References Cited

U.S. PATENT DOCUMENTS

| | | | |
|---|---|---|---|
| 8,692,498 | B2 | 4/2014 | Feldstein et al. |
| 10,511,239 | B2 | 12/2019 | Rivera et al. |
| 10,516,353 | B2 | 12/2019 | Rivera et al. |
| 10,530,279 | B2 | 1/2020 | Rivera et al. |
| 2003/0227271 | A1 | 12/2003 | Shindo |
| 2007/0272374 | A1 | 11/2007 | Moseley et al. |
| 2010/0006240 | A1 | 1/2010 | Cieslik |
| 2010/0087958 | A1 | 4/2010 | Mullet et al. |
| 2011/0061818 | A1 | 3/2011 | Geriniere et al. |
| 2020/0199934 | A1* | 6/2020 | Colson ...................... E06B 9/72 |

* cited by examiner

SYSTEM AND METHOD FOR CONTROLLING ONE OR MORE ROLLER SHADES

BACKGROUND OF THE INVENTION

Technical Field

Aspects of the embodiments relate to motorized window treatments, and more particularly to systems, methods, and modes for controlling one or more roller shades in order to substantially synchronize and uniformly align a plurality of roller shades.

Background Art

Motorized window treatments provide a convenient one-touch control solution for screening windows, doors, or the like, to achieve privacy and thermal effects. Various types of motorized window treatments exist, including motorized roller shades, inverted rollers, Roman shades, Austrian shades, pleated shades, blinds, shutters, skylight shades, garage doors, or the like. A typical motorized window treatment includes a shade material manipulated by the motor to cover or uncover a structural opening, such as a window.

Movement uniformity is a critical factor when multiple motorized roller shades are installed in the same visual area, for example to cover a plurality of adjacently disposed windows in a room. When the plurality of shades are being controlled together to shade a room, it is desired for the bottom edges of the shade material, typically terminating by a hem bar, of the plurality of shades to travel uniformly and arrive at the desired position at the same time. A common problem with motorized roller shades is when all the shade motors are operating at the same rotational speed, or revolutions per minute (RPM), there is no guarantee that the hem bars of these shades will arrive at the selected position at the same time. When there is a bank of misaligned window shades, misalignment is a condition that is readily noticeable at any distance and is aesthetically unpleasing. Misalignment may occur due to various factors such as differently sized roller tubes, shade material selection, variations in shade material thickness, installation variations, drive type, or the like. For example, if a wide roller shade requiring a thicker roller tube is installed next to narrower roller shade with a thinner roller tube, the hem bar of the shade with the thicker roller tube, with the motor moving at the same RPM, will arrive at a desired position before the shade with the thinner roller tube as the shade material would unroll faster from a thicker roller tube. Likewise, if all the shades in a room are each in different starting positions or are of different length, each shade, moving at the same constant RPM, will arrive at the selected position at a different time.

Therefore, a need exists for controlling one or more roller shades in order to substantially synchronize and uniformly align a plurality of roller shades.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a motorized window treatment that will obviate or minimize problems of the type previously described.

More particularly, it is an aspect of the embodiments to provide systems, methods, and modes for controlling one or more roller shades in order to substantially synchronize and uniformly align a plurality of roller shades.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a motorized shade is provided for covering an architectural opening comprising a roller tube, a shade material connected to the roller tube, a motor adapted to rotate the roller tube, and a controller. The controller is adapted to: drive the motor between an upper limit position and a lower limit position of the shade material at a first rotational speed; determine a run time it took the motor to move the shade material between the upper limit position and the lower limit position; using at least the determined run time, determine a second rotational speed for the controller to drive the motor between the upper limit position and the lower limit position within a predetermined run time; and set the motor to operate according to the second rotational speed.

According to an embodiment, the motor drive unit comprises a position detector adapted to determine a position of the motor. The position detector may comprise a position feedback sensor, a motor control circuit adapted to estimate the position of the motor using voltage generated by the motor, or the like. According to an embodiment, the motor drive unit may receive the upper limit position and the lower limit position from a user interface.

According to one embodiment, the controller may drive the motor between the upper limit position and the lower limit position by directing the motor to lower the shade material from the upper limit position to the lower limit position. According to another embodiment, the controller may drive the motor between the upper limit position and the lower limit position by directing the motor to raise the shade material from the lower limit position to the upper limit position. The controller may set the motor to operate according to the second rotational speed when the motor is directed to lower the shade material and/or when the motor is directed to raise the shade material. According to another embodiment, the controller determines the second rotational speed for raising the shade material within the predetermined run time and a different third rotational speed for lowering the shade material within the predetermined run time.

According to one embedment, the controller receives the predetermined run time from a user interface. According to another embodiment, the predetermined run time is preset and stored in a memory of the motorized shade.

According to one embedment, during operation and after each full run of the shade material between the upper limit position and the lower limit position, the controller determines an updated rotational speed within the predetermined run time and sets the motor to operate according to the updated rotational speed. According to another embodiment, during operation and after each full run of the shade material between the upper limit position and the lower limit position, the controller determines an updated rotational speed within the predetermined run time, wherein after a predetermined number of full runs the controller determines an averaged rotational speed from the determined updated rotational speeds and sets the motor to operate according to the averaged rotational speed.

According to an embodiment, the controller determines the second rotational speed using the following formula:

$$RPM2=(T1*RPM1)/T2$$

where,

RPM1 is the first rotational speed,

RPM2 is the second rotational speed,

T1 is the determined run time; and

T2 is the predetermined run time.

According to another aspect of the embodiments, a system is provided for substantially aligning a plurality of motorized shades comprising a first shade and a second shade. Each shade comprises a roller tube, a shade material connected to the roller tube, a motor adapted to rotate the roller tube, and a controller. The controller of each first and second shade is adapted to drive the motor between an upper limit position and the lower limit position of the shade material; determine a run time it took the motor to move the shade material between the upper limit position and the lower limit position; using at least the determined run time, determine a rotational speed for the controller to drive the motor between the upper limit position and the lower limit position within a predetermined run time; and set the motor to operate according to the determined rotational speed. According to an embodiment, the determined rotational speed of the first shade is different than the determined rotational speed of the second shade.

According to a further aspect of the embodiments, a system is provided for substantially aligning a plurality of motorized shades comprising a first shade and a second shade, each comprising a roller tube, a shade material connected to the roller tube, a motor adapted to rotate the roller tube, and a controller adapted to control the motor. The controller of the first shade is adapted to operate according to a first rotational speed and further to: drive the motor at the first rotational speed between an upper limit position and a lower limit position of the shade material of the first shade; determine a first run time it took the motor to move the shade material between the upper limit position and the lower limit position; and transmit the first run time. The controller of the second shade is adapted to: receive the first run time; drive the motor between an upper limit position and a lower limit position of the shade material of the second shade; determine a run time it took the motor to move the shade material of the second shade between the upper limit position and the lower limit position of the second shade; using the determined run time, determine a second rotational speed for the controller to drive the motor between the upper limit position and the lower limit position of the second shade within the first run time; and set the motor to operate according to the second rotational speed.

According to an embodiment, the first rotational speed is set based on an input receive from a user interface. According to another embodiment, the first rotational speed is preset and stored in a memory of the first shade. According to one embodiment, the first shade transmits the first run time to the second shade. According to another embodiment, the first shade transmits the first run time to a system control processor, and wherein the system control processor transmits the first run to the second shade.

According to yet another aspect of the embodiments, a motorized shade is provided for covering an architectural opening comprising a roller tube, a shade material connected to the roller tube, a motor adapted to rotate the roller tube, and a controller. The controller is adapted to: drive the motor between a first limit position and a second limit position of the shade material at a first rotational speed; determine a run time it took the motor to move the shade material between the first limit position and the second limit position; using at least the determined run time, determine a second rotational speed for the controller to drive the motor between the first limit position and the second limit position within a predetermined run time; and set the motor to operate according to the second rotational speed.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
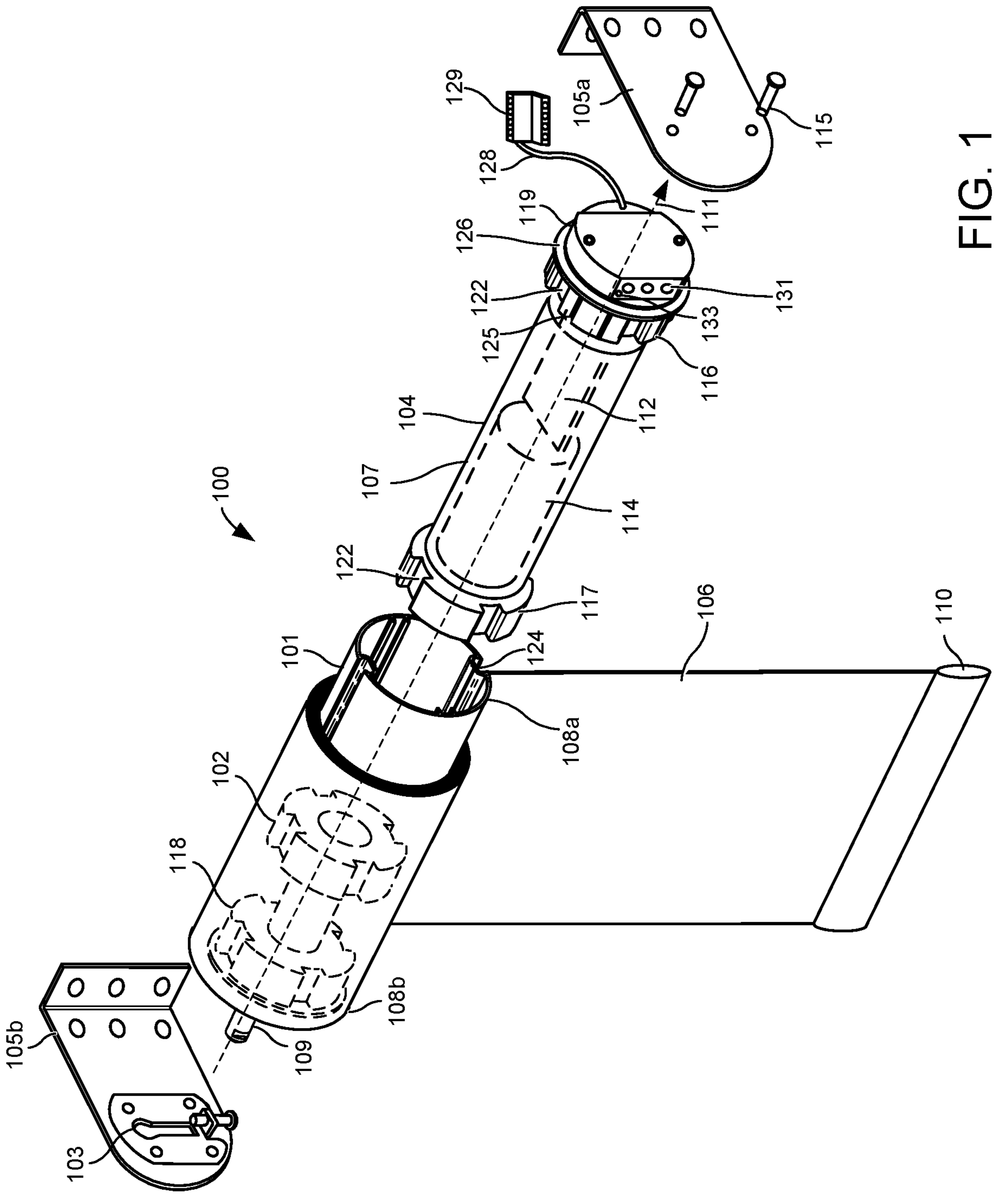

FIG. 1 illustrates an exploded front perspective view of a roller shade according to an illustrative embodiment.

Figure 2:
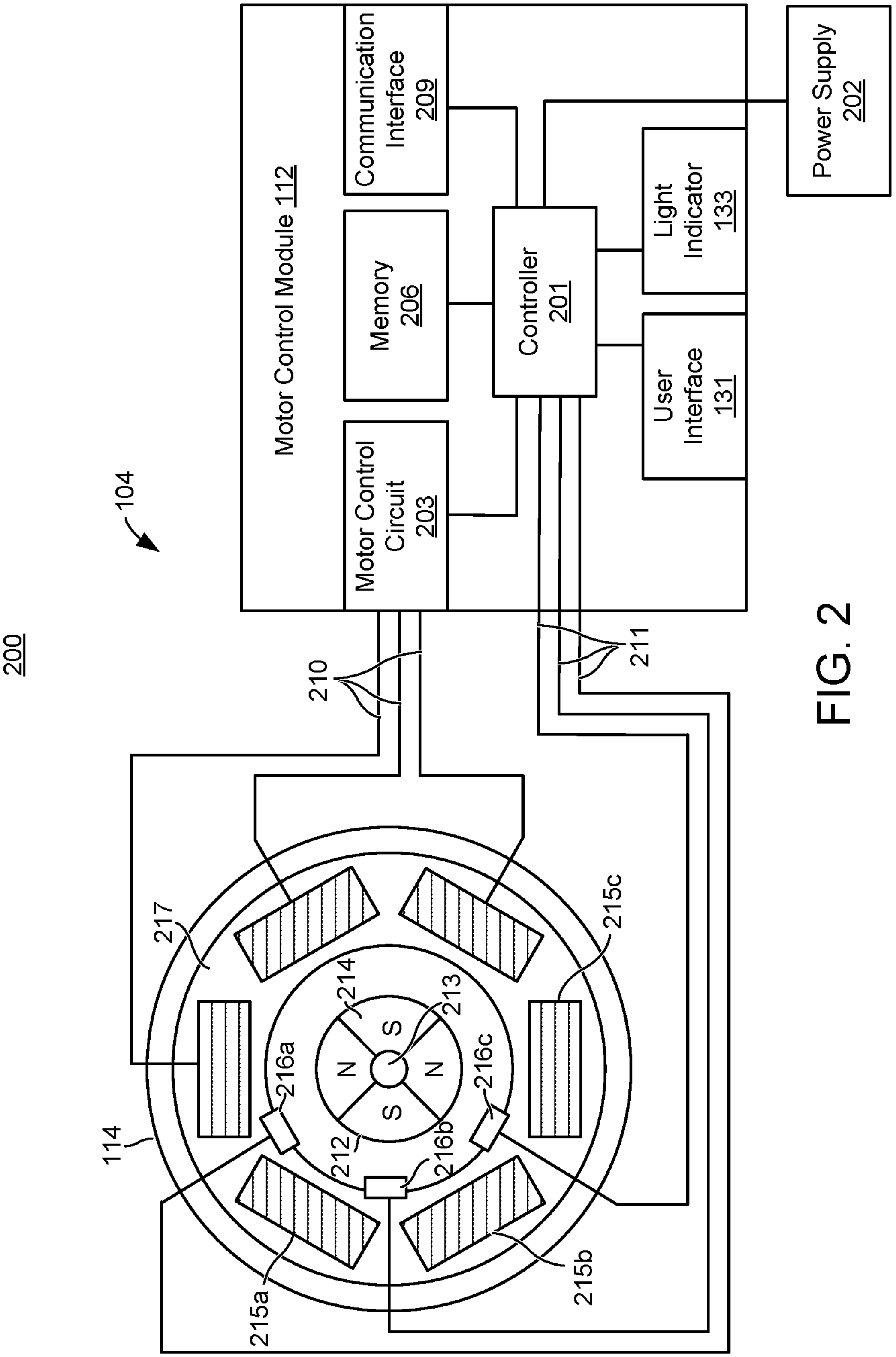

FIG. 2 illustrates a block diagram of a motor drive unit of the roller shade according to an illustrative embodiment.

Figure 3:
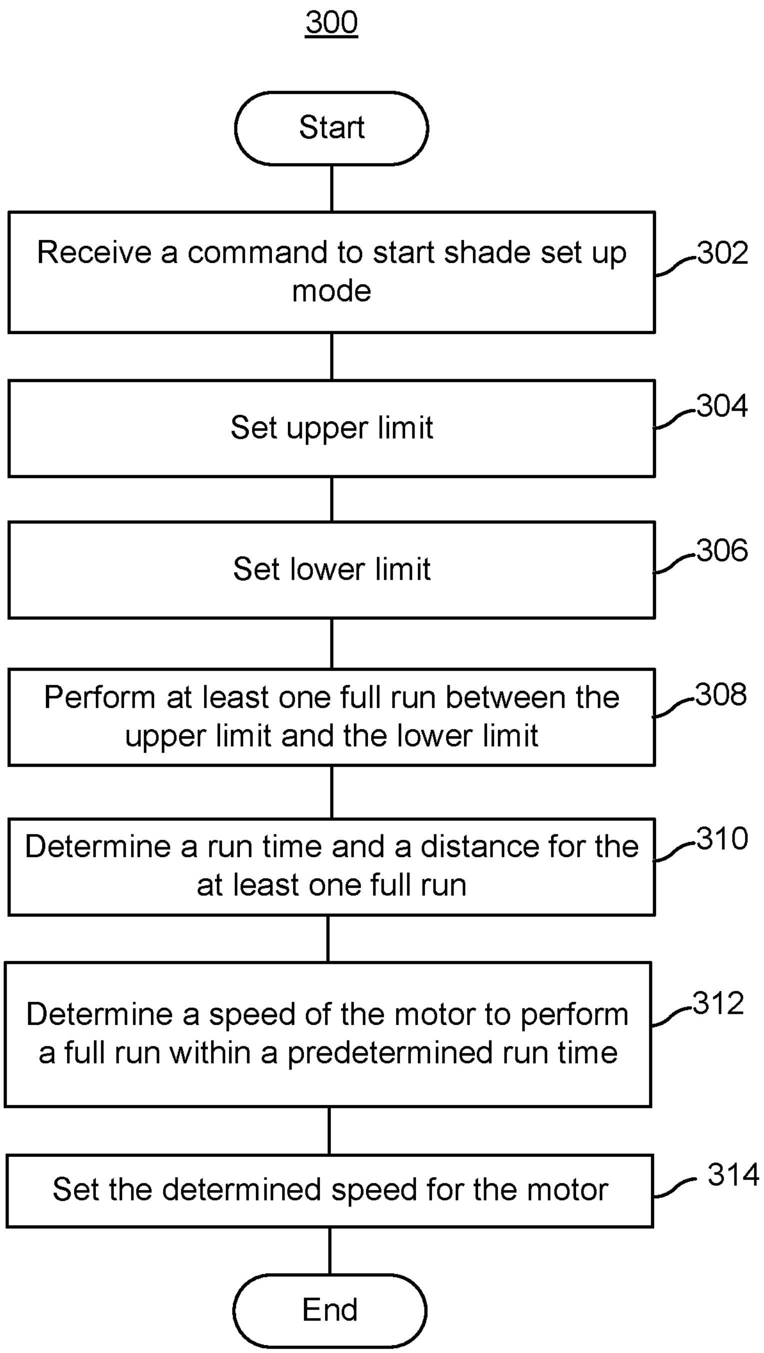

FIG. 3 shows a flowchart illustrating a method of determining a rotational speed for a roller shade motor to synchronize a plurality of shades according to an illustrative embodiment.

Figure 4:
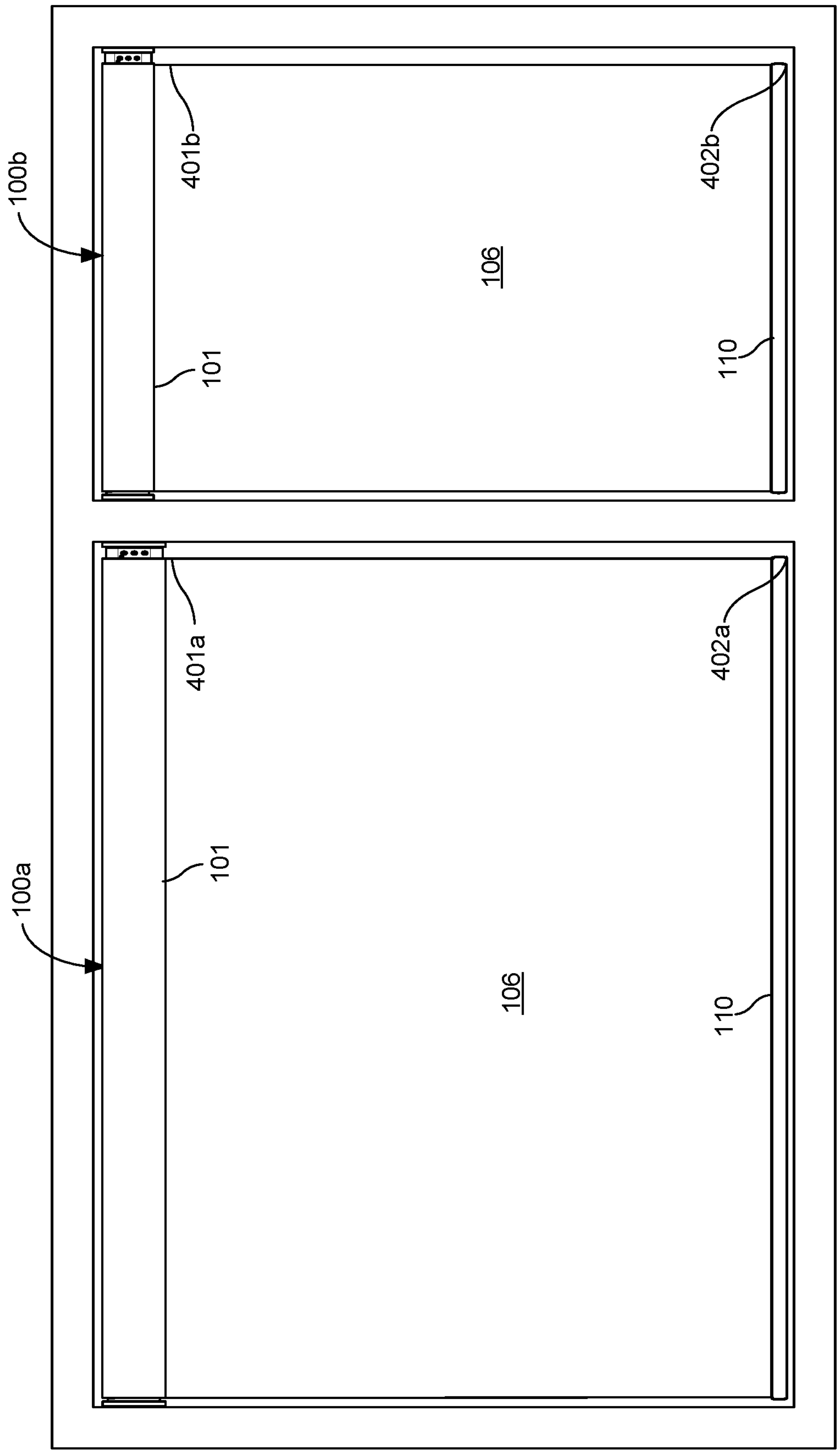

FIG. 4 illustrates a front view of a pair of roller shades installed in adjacently positioned windows according to an illustrative embodiment.

Figure 5:
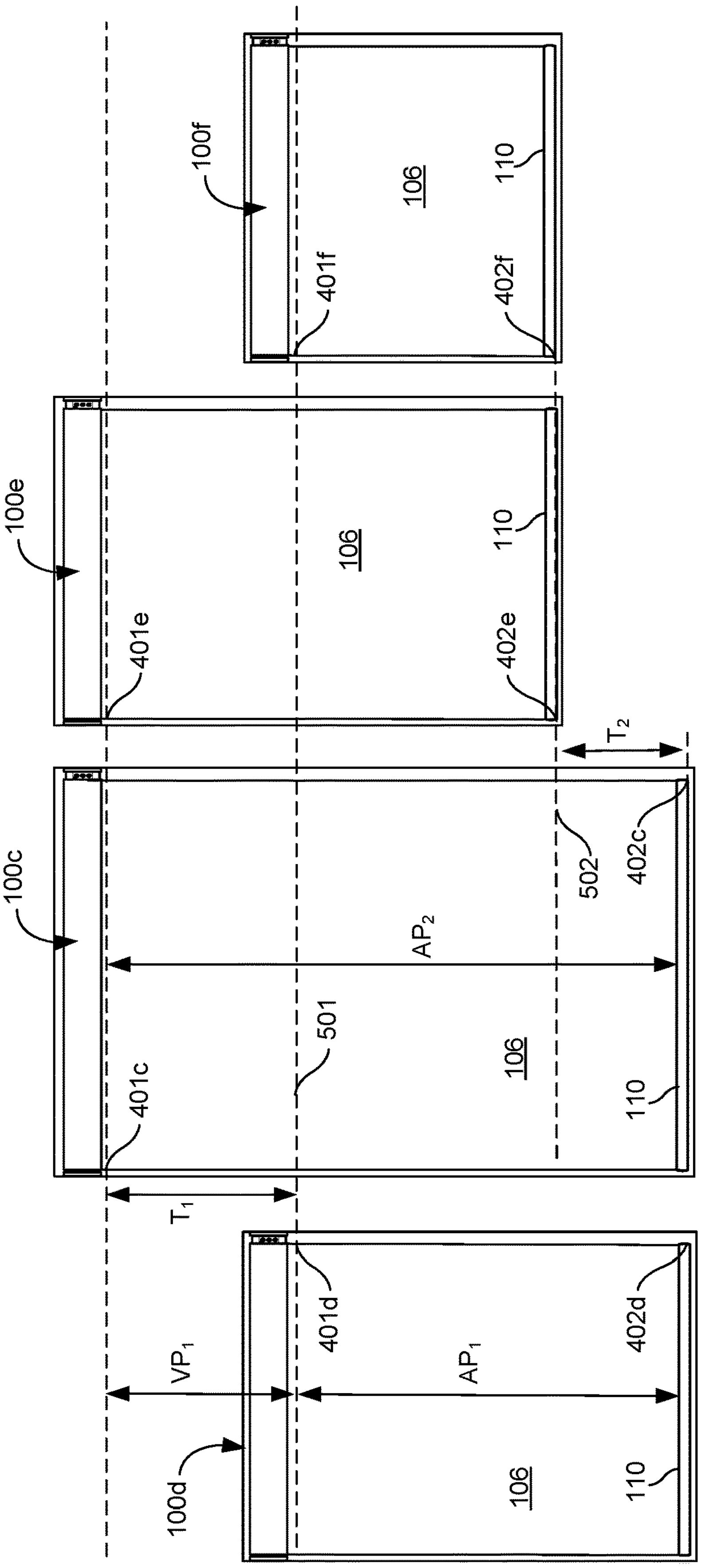

FIG. 5 illustrates a front view of a plurality of roller shades installed in adjacently positioned windows according to an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Roller Shade
100*a-f* Roller Shade(s)
101 Roller Tube
102 Idler Assembly
103 Keyhole
104 Motor Drive Unit
105*a* First Mounting Bracket
105*b* Second Mounting Bracket
106 Shade Material
107 Motor Housing
108*a* First End
108*b* Second End
109 Idler Pin
110 Hem Bar
111 Longitudinal Axis
112 Motor Control Module
114 Motor
115 Screws
116 Crown Adapter Wheel
117 Drive Wheel
118 Idler Body
119 Motor Head
122 Channels
124 Projections
125 Teeth
126 Flange
128 Power Cord
129 Terminal Block
131 User Interface/Buttons
133 Light Indicator/LED
200 Block Diagram of the Motor Drive Unit
201 Controller
202 Power Supply
203 Motor Control Circuit
206 Memory
209 Communication Interface
210 Motor Control Signal
211 Feedback Signal
212 Rotor
213 Driving Shaft
214 Magnet
215*a-c* Phase Windings
216*a-c* Hall Effect Sensors
217 Stator
300 Flowchart Illustrating a Method of Determining a Rotational Speed for a Roller Shade Motor
302-314 Steps of Flowchart 300
401*a-f* Upper Limit(s)
402*a-f* Lower Limit(s)
501 Intermediate Limit
502 Intermediate Limit

LIST OF ACRONYMS USED IN THE SPECIFICATION IN ALPHABETICAL ORDER

The following is a list of the acronyms used in the specification in alphabetical order.

AP Actual Position Range
ASIC Application Specific Integrated Circuit
BLDC Brushless Direct Current
CAT5 Category 5 Cable
EMF Back Electromotive Force
IR Infrared
LAN Local Area Network
LED Light Emitting Diode
N North
PCB Printed Circuit Board
PWM Pulse-Width Modulated
PoE Power over Ethernet
RAM Random-Access Memory
RF Radio Frequency
ROM Read-Only Memory
RPM Revolutions per Minute
S South
T Time
VP Virtual Position Range Mode(s) for Carrying Out the Invention For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamline technology, improving the quality of life in commercial buildings, universities, hotels, hospitals, and homes, among other locations. Accordingly, the systems, methods, and modes of the aspects of the embodiments described herein can be manufactured by Crestron, located in Rockleigh, NJ The different aspects of the embodiments described herein pertain to the context of a motorized window treatment, but is not limited thereto, except as may be set forth expressly in the appended claims. While the motorized window treatment is described herein for covering a window, the motorized window treatment may be used to cover other types of architectural openings, such as doors, wall openings, or the like. Additionally, while the embodiments described herein reference a roller shade, the embodiments described herein may be implemented in other types of motorized window treatments, such as inverted rollers, Roman shades, Austrian shades, pleated shades, blinds, shutters, skylight shades, garage doors, or the like.

Disclosed herein are systems, methods, and modes for controlling one or more roller shades in order to synchronize and uniformly align a plurality of roller shades, and more particularly by determining a rotational speed for a roller shade motor such that a plurality of shades operate at different rotational speeds and thereby uniformly travel and arrive at a desired position at substantially the same time.

Referring to FIG. 1, there is shown an exploded front perspective view of a roller shade 100 according to one aspect of the embodiments. While a particular roller shade construction is illustrated in FIG. 1, it is for illustrational purposes only; the roller shade construction may vary and the present embodiments of aligning roller shades may be used with other types of rollers shade construction and configuration. Roller shade 100 generally comprises a roller tube 101, idler assembly 102, motor drive unit 104, shade material 106, and a hem bar 110. Shade material 106 is connected at its top end to the roller tube 101 and at its bottom end to the hem bar 110. Hem bar 110 can comprise a weighted bar that runs longitudinally and laterally across the width of the shade material 106 to minimizes movement in the field and properly tensions the shade material 106 to allow for a straight hang. Shade material 106 wraps around the roller tube 101 and is unraveled from the roller tube 101 to cover an architectural opening, such as a window, a door, a wall opening, or the like. In various embodiments, shade material 106 can comprise fabric, plastic, vinyl, or other materials known to those skilled in the art.

Roller tube 101 is generally cylindrical in shape and laterally extends from a first end 108*a* to a second end 108*b* along longitudinal axis 111. In various embodiments, the roller tube 101 comprises aluminum, stainless steel, plastic, fiberglass, or other materials known to those skilled in the art. The first end 108*a* of the roller tube 101 may receive a motor drive unit 104 and the second end 108*b* may receive an idler assembly 102. The idler assembly 102 may comprise an idler pin 109 and an idler body 118 rotatably connected to the idler pin 109 via ball bearings therein (not shown). The idler body 118 is inserted into the roller tube 101 and is operably connected to the roller tube 101 such that rotation of the roller tube 101 also rotates the idler body 118 about the idler pin 109.

The motor drive unit 104 may comprise a motor head 119, a crown adapter wheel 116, a motor housing 107 containing a motor control module 112 and a motor 114 therein, and a drive wheel 117. The motor drive unit 104 may be inserted within the roller tube 101 at the first end 108*a* such that it extends along longitudinal axis 111. The crown adapter wheel 116 and drive wheel 117 are generally cylindrical in shape and are inserted into and operably connected to roller tube 101 at its first end 108*a*. Crown adapter wheel 116 and drive wheel 117 comprise a plurality of channels 122 extending circumferentially about their external surfaces that mate with complementary projections 124 radially extending from an inner surface of roller tube 101 to lock their respective rotation. Crown adapter wheel 116 can further comprise a plurality of teeth 125 extending circumferentially about its external surface to form a friction fit between the crown adapter wheel 116 and the inner surface of the roller tube 101. The crown adapter wheel 116 may be rotatably attached to the motor head 119 via a ball bearing therein (not shown). Crown adapter wheel 116 can further comprise a flange 126 radially extending therefrom to prevent the motor drive unit 104 from sliding entirely into the roller tube 101. The drive wheel 117 is operably connected, either directly or indirectly through a motor drivetrain (not shown), to an output shaft 213 (FIG. 2) of the motor 114, such that rotation of the motor output shaft 213 also rotates the drive wheel 117.

During installation, the roller shade 100 is mounted on or in a window between the first and second mounting brackets 105*a* and 105*b*. The roller shade 100 may first be mounted to the second mounting bracket 105*b* by inserting the idler pin 109 into a keyhole 103 of the second mounting bracket 105*b*. The roller shade 100 may then be mounted to the first mounting bracket 105*a* by snapping the motor head 119 of the motor drive unit 104 to the first mounting bracket 105*a* or coupling the motor head 119 to the first mounting bracket 105*a* using screws 115. Other types of brackets or mounting mechanisms may be utilized without departing from the scope of the present embodiments.

In operation, the shade material 106 is rolled down and rolled up between an upper limit and a lower limit via the motor drive unit 104. Particularly, the motor 114 drives the drive wheel 117, which in turn engages and rotates the roller tube 101 about longitudinal axis 111. The roller tube 101, in turn, engages and rotates the crown adapter wheel 116 and idler body 118 about longitudinal axis 111 with respect to the motor 114, while the motor housing 107, including the motor 114 and motor control module 112, remain stationary. As a result, the shade material 106 may be lowered from an upper limit where it is at an opened or rolled up position and substantially fully wrapped about the roller tube 101, to a lower limit where it is at a closed or rolled down position and substantially unraveled from the roller tube 101, and vice versa.

FIG. 2 is an illustrative block diagram 200 of the motor drive unit 104 according to one embodiment. The motor drive unit 104 may comprise the motor 114 and a motor control module 112. The motor control module 112 operates to control the motor 114, directing its operation, including direction, speed, and position. The motor control module 112 may comprise fully integrated electronics included on a printed circuit board (PCB). The motor control module 112 can comprise a controller 201, motor control circuit 203, memory 206, communication interface 209, user interface 131, and light indicator 133. Power supply 202 can provide power to the circuitry of the motor control module 112 and in turn the motor 114. Power can be supplied to the motor control module 112 through a power cord 128 (FIG. 1) by connecting a terminal block 129 to a dedicated power supply 202, such as the CSA-PWS40 or CSA-PWS10S-HUB-ENET power supplies, available from Crestron Electronics, Inc. of Rockleigh, NJ In another embodiment, the motor drive unit 104 may be battery operated and as such may be connected to an internal or external power supply 202 in a form of batteries. In yet another embodiment, the motor drive unit 104 may further receive power from solar panels placed in proximity to the window to aggregate solar energy.

Controller 201 can represent one or more microprocessors, and the microprocessors can be "general purpose" microprocessors, a combination of general and special purpose microprocessors, or application specific integrated circuits (ASICs). Controller 201 can provide processing capability to provide processing for one or more of the techniques and functions described herein. Memory 206 can be communicably coupled to controller 201 and can store data and executable code. In another embodiment, memory 206 is integrated into the controller 201. Memory 206 can represent volatile memory such as random-access memory (RAM), but can also include nonvolatile memory, such as read-only memory (ROM) or Flash memory.

Motor control module 112 may further comprise a communication interface 209, such as a wired and/or a wireless communication interface, configured for receiving control commands from an external control point. A wireless communication interface 209 may be configured for bidirectional wireless communication with other electronic devices over a wireless network. In various embodiments, the wireless interface 209 can comprise a radio frequency (RF) transceiver, an infrared (IR) transceiver, or other communication technologies known to those skilled in the art. In one embodiment, the wireless interface 209 communicates using the infiNET EX® protocol from Crestron Electronics, Inc. of Rockleigh, NJ In another embodiment, communication is employed using the ZigBee® protocol from ZigBee Alliance. In yet another embodiment, wireless communication interface 209 may communicate via Bluetooth transmission. A wired communication interface 209 may be configured for bidirectional communication with other devices over a wired network. The wired interface 209 can represent, for example, an Ethernet or a Cresnet® port. Cresnet® provides a network wiring solution for Crestron® keypads, lighting controls, thermostats, and other devices. The Cresnet® bus offers wiring and configuration, carrying bidirectional communication and 24 VDC power to each device over a simple 4-conductor cable. In various aspects of the embodiments, the communication interface 209 and/or power supply 202 can comprise a Power over Ethernet (PoE) interface by which the controller 201 can receive both electric power signal and control input from a network through the PoE interface. For example, the PoE interface may be connected through category 5 cable (CAT5) to a local area network (LAN) which contains both a power supply and multiple control points and signal generators. Additionally, through the PoE interface, the controller 201 may interface with the internet and receive control inputs remotely, such as from a homeowner running an application on a user communication device, such as a smart phone.

Motor control module 112 can further comprise a local user interface 131, such as a three-button interface (FIG. 1), that allows users to perform various tasks, such as to test the roller shade 100 after installation, set the shade limits, perform adjustments, perform basis operation, perform the synchronizing technique disclosed herein, or the like. Furthermore, the motor control module 112 may comprise a light indicator 133, such as a multicolor light emitting diode (LED), for indicating the motor status.

The control commands received by the controller 201 may be a direct user input to the controller 201 from the user interface 131 or a wired or wireless signal received by the communication interface 209 from an external control point. For example, the controller 201 may receive a control command from a wall-mounted button panel or a touch-panel in response to a button actuation or similar action by the user. Control commands may also originate from a signal generator such as a timer or external sensors, such as occupancy sensors. Accordingly, the motor control module 112 can integrate seamlessly with other control systems using the interface 209 to be operated from keypads, wireless remotes, touch screens, and user communication devices, such as smart phones. Additionally, the motor control module 112 can be integrated within a large scale building automation system or a small scale home automation system and be controllable by a central control processor, such as the PRO4 control processor available from Crestron Electronics, Inc., that networks, manages, and controls a building management system.

According to one embodiment, the motor 114 may comprise a brushless direct current (BLDC) electric motor. According to another embodiment, the motor 114 may comprise a brushed DC motor, or another motor known in the art capable of adjusting its rotational speed and for which rotational position can be tracked. The motor 102 may comprise a rotor 212 and a stator 217. The rotor 212 may comprise a driving shaft 213 and a permanent magnet 214 divided into one to eight or more north (N)-south (S) pole pairs. The stator 217 may be positioned about the rotor 212 and may comprise a plurality of steel laminations that carry phase windings 215*a-c* defining the stator pole pairs. The motor 114 operates via electrical commutation generated by the motor control circuit 203 at the direction of the controller 201. Commutation is the process of switching current in the phases in order to generate motion. Particularly, the motor control circuit 203 outputs a motor control signal 210 determined by the controller 201 that sequentially energies the coils in the phase windings 215*a-c*. Current is run through the phase windings 215*a-c* in alternating directions in a sequence such that the permanent magnet poles follow the revolving magnetic field that is caused by the windings. One control scheme for electronic commutation involves sinusoidal commutation by which the motor control circuit 203 outputs a motor control signal 210 comprising at least one sinusoidal wave, each configured to energize a corresponding phase of the motor. For a three-phase motor 114 displayed in FIG. 2, the motor control signal 210 may comprise a three phase sinusoidal waveform having three sinusoidal waves across the three phases of the motor 114, which may be 120 degrees out of phase. The phase angle of these sinusoidal waveforms depends on the position of the rotor 212 as reported by the Hall Effect sensors feedback. However, the motor control signal 210 may comprise less or more sinusoidal waves to correspond to the number of phases included in the motor, and the sinusoidal waves may be offset by other number of degrees. The sinusoidal waveform may be synthesized at the motor control circuit 203 using pulse width modulation (PWM). The frequency of this waveform may be determined by the controller 201 using a linear relation that involves the desired speed of the motor 114 in revolutions per minute (RPM) as well as the given motor parameters. To maintain constant output speed, as more load is exerted on the motor 114, the controller 201 may change the frequency, amplitude, and/or phase of the sinusoidal waveform, and thereby change the speed of the motor 114, based on speed errors reported by the Hall Effect sensors 216*a-c*.

The motor 114 may further comprise at least one position detector adapted to detect or determine the position of the rotor 212 in relation to the stators 215*a-c* and provide a feedback signal 211 to the controller 201. For example, as shown in FIG. 2, three Hall Effect sensors 216*a-c* may be utilized, which may be arranged around the rotor 212 to detect the position of the rotor 212 with respect to the stators 215*a-c* and generate the feedback signal 211 over a plurality of Hall Effect sensor channels. Using the Hall Effect sensors 216*a-c*, the controller 201 can determine the timing of the current running through the phase windings 215*a-c* and also determine the speed of the rotor 212 using the time interval between signals from the Hall Effect sensors 216*a-c*. Accordingly, the controller 201 can determine the direction, speed, and position of the motor's shaft 213 and may employ the information provided by the Hall Effect sensors 216*a-c* as a feedback for control of the motor 114.

However, other types of position detectors may be utilized to determine the position of the rotor with respect to the stator without departing from the scope of the present embodiments. The at least one position detector may comprise one or more of a position feedback sensor (such as a Hall Effect sensor, a magnetic position sensor, or the like), a resolver, an encoder (such as an optical encoder, a magnetic encoder, or the like), a current sense circuit, a voltage sense circuit, a back electromotive force (EMF) sense circuit, any combinations thereof, or any other similar position detector capable of determining the position of a rotor with respect of a stator in a motor. For example, instead of using a sensor type position detector, the motor control module 112 may comprise a sensorless design where timing and position of the motor 114 may be detected using the motor control circuit 203 of the motor control module 112. This eliminates the need for Hall Effect sensors 216*a-c* and the feedback signals 211 over the communication bus that can be prone to delays. The motor control circuit 203 may comprise various components known in the art to enable sensorless motor control and position detection. According to one embodiment, the motor control circuit 203 may comprise a crystal controlled oscillator, comparators, digital filters, and other components known in the art. The controller 201 may estimate the position of the rotor 212 with respect to the stator 217 using back electromotive force (EMF) generated in the stator windings 215*a-c* by the motor as the rotor 212 moves past the windings 215*a-c* in the stator 217. The voltage that is generated during the non-driven section for a particular phase is the back-EMF voltage. The magnitude of the back-EMF voltage is proportional to the speed of the motor. The motor control circuit 203 is adapted to detect the motor position based on the zero-cross events in the back-EMF signal using algorithms known in the art. According to another embodiment, the motor 114 can use a crystal or an oscillator to control the timing, versus having the motor control system handle the timing.

The present embodiments pertain to systems, methods, and modes for controlling one or more roller shades in order to substantially synchronize and uniformly align a plurality of roller shades. As such, when multiple roller shades are used to shade a room, and all the shades are commanded to get raised or lowered at the same time, the bottom edges of the shades, and namely their hem bars, will travel substantially uniformly and/or arrive at substantially the same selected position at the same time. This will allow side by side shade installations to substantially uniformly operate and/or track with each other, depending on the installation and desired effect. In addition, the present embodiments allow for shade synchronization irrespective of installation variations between shades or the size of the roller shades, including the radius and length of the roller tube or the type, width, length, thickness and weight of the shade material, and the size and weight of the hem bar.

FIG. 4 illustrates one exemplary installation of a plurality of roller shades where synchronization and uniform movement is desired. There is shown a pair of roller shades, a first roller shade 100*a* and a second roller shade 100*b*, installed in adjacently positioned windows. The first roller shade 100*a* may be wider and thereby contain a thicker roller tube 101 than roller tube 101 of the second roller shade 100*b*. First and second roller shades 100*a* and 100*b* may operate between a set upper limit 401*a/b* and a set lower limit 402*a/b* at which their hem bars 110 are substantially aligned with each other when both the shades 100*a-b* are either fully opened or fully closed, respectively. Were the motors 114 of the first and second roller shades 100*a* and 100*b* operate at the same outputted rotational speed, for example in the lower direction, the hem bar 110 of the first roller shade 100*a* will reach the desired position, for example the lower limit 402*a*, faster than the hem bar 110 of the second roller shade 100*b* reaches its lower limit 402*b*. According to the present embodiments, the output rotational speed of each roller shade 100*a* and 100*b* is determined and set such that the hem bars 110 of the plurality of shades 100*a-b* travel substantially uniformly and reach the desired position, e.g., lower limits 402*a-b* or the upper limits 401*a-b*, at the same time.

According to an embodiment, FIG. 3 is a flowchart 300 illustrating the steps for a method of determining a rotational speed for a roller shade motor to synchronize a plurality of roller shades. Method shown in FIG. 3 is performed and repeated for each installed roller shade. For example, initially the first roller shade 100*a* may be configured according to method shown in FIG. 3. In step 302, the controller 201 of the first roller shade 100*a* may receive a command to start or initiate the shade set up mode. The method shown in FIG. 3 may be initiated during configuration of the roller shade at the factory or after installation at the installation site, after each power up of the controller 201, upon receipt of a command to perform a set up from a user interface (such as from the user interface 131 of the controller 201, from a setup application running on a user communication device, or the like), in response to a reset command received from a user, if any of the limits have been changed, or the like. In response to any such occurrence, any previously stored set up parameters may be cleared from memory 206.

In step 304, the shade material 106 may be adjusted to a desired opened position to set the upper limit. For example, the user may utilize the user interface 131 to raise or slightly lower the shade material 106 and hem bar 110 to a desired position 401*a* where the shade material 106 is at an opened or rolled up position and substantially fully wrapped about the roller tube 101. However, the upper limit may also be set where the hem bar 110 hangs at some distance below the roller tube 101, depending on the installation, for example if a fascia is used or to align with neighboring shades. The user may press a button or a selection on a user interface to direct the controller 201 to store the position, for example as determined by the Hall Effect sensors 216*a-c* or the motor control circuit 203, as the upper limit in memory 206.

In step 306, the user may command the controller 201 to drive the motor 114 in a lowering direction until the shade material 104 is lowered to a closed position to set up the lower limit. For example, the user may utilize the user interface 131 to lower the shade material 106 and hem bar 110 to a desired position 402*a* where it is at a closed or rolled down position and substantially unraveled from the roller tube 101. The user may press a button or a selection on a user interface to direct the controller 201 to store the position as the lower limit, for example as determined by the Hall Effect sensors 216*a-c* or the motor control circuit 203, in memory 206. The upper limit and the lower limit values can be used as position references to track the position of the shade material 106 between these limits.

In step 308, the controller 201 may perform at least one full run of the shade material 106 between the upper limit 401*a* and the lower limit 402*a*. For example, the controller 201 may direct the motor 114 to raise the shade material 106 and hem bar 110 from the lower limit 402*a* to the upper limit 401*a*, lower the shade material 106 and hem bar 110 from the upper limit 401*a* to the lower limit 402*a*, or perform a full run in each of the directions. During the full run, the controller 201 may direct the motor 114 to operate at an initial rotational speed level.

During the full run, in step 310, the controller 201 may determine the run time, i.e., the time it took the shade material 106 to raise or lower between the upper limit 401*a* and lower limit 402*a*. The controller 201 may also determine the distance of the at least one full run, which can be recorded by the number of required revolutions.

In step 312, using the determined run time, the controller 201 may determine the rotational speed for the controller to drive the motor, for example in RPM, to perform a full run within a predetermined run time. According to an embodiment, the controller may determine the rotational speed for controller to drive the motor using the following formula:

$$RPM2=(T1*RPM1)/T2$$

where,

RPM1 is the first or initial rotational speed,

RPM2 is the second or determined rotational speed,

T1 is the determined run time; and

T2 is the predetermined run time.

According to an embodiment, the controller 201 may determine the rotational speed for the motor based on a full run in a single direction. According to another embodiment, the controller 201 may determine a different speed for the motor for each direction of travel—one speed to raise the shade material 106 and hem bar 110 and another speed to lower the shade material 106 and hem bar 110. According to yet another embodiment, the controller 201 can reiterate the process a predetermined number of times in each or both directions (by repeatedly raise and lower the shade material 101) to determine an average speed for the motor to perform a full run within a predetermined run time.

In step 314, the controller 201 may set the determined speed for the motor 114 of the first roller shade 100*a* by storing it in memory 206. The controller 201 of the first roller shade 100*a* will then utilize the stored determined speed as its reference speed during operation of the motor 114. For example, according to an embodiment, during operation, the controller 201 may operate the motor 114 to maintain it substantially at the determined output speed by varying the frequency, amplitude, and/or phase of the sinusoidal waveform based on speed errors reported by the Hall Effect sensors 216*a-c* or via sensorless control algorithms.

The process in FIG. 3 may then be repeated for the remainder of the shades in an installation using the same predetermined run time value. For example, referring to FIG. 4, the process in FIG. 3 may be repeated for the second roller shade 100*b* to determine the rotational speed for the motor 114 of the second roller shade 100*b* using the same predetermined run time such that the shade material 106 of the second roller shade 100*b* is raised or lowered during a full run within the same predetermined run time as the first roller shade 100*a*. Accordingly, both the shade material 106 and hem bar 110 of the first and second roller shades 100*a* and 100*b* will arrive at the desired position, such as the upper limits 401*a-b* or the lower limits 402*a-b*, respectively, within the same predetermined run time. Consequently, the determined rotational speed of the first roller shade 100*a* will be different than the determined rotational speed of the second roller shade 100*b*.

To further ensure that a plurality of roller shades, such as roller shades 100*a* and 100*b* installed in the same room, are substantially synchronized and uniformly aligned during operation, the plurality of the roller shades 100*a-b* may be logically grouped together and operated using a broadcast group command. Such a command may, for example, be received by the plurality of grouped shades 100*a-b* from an external control point, such as a keypad or a building control processor. A broadcast group command ensures that the plurality of grouped shades 100*a-b* receive the command substantially at the same time and start moving the shade material 106 at substantially the same time, which thereby will arrive at their destination at substantially the same time.

According to a further embodiment, a user may make adjustments to the determined rotational speed, for example by incrementally increasing or decreasing the determined rotational speed, using a user interface in communication with the roller shades 100*a-b*. For example, the user may adjust the rotational speed using the user interface 131 of the roller shade 100. In another embodiment, the user may access a setup application running on a user communication device, such as a smart phone, comprising a user interface, such as a slider, that the user can utilize to incrementally adjust the determined rotational speed. The setup application on the user communication device can directly, or indirectly through a central control processor of an automation system, communicate the selected adjusted rotational speed to the controller 201 via the communication interface 209 of the roller shade 100.

According to an embodiment, the predetermined run time can comprise a time predetermined at a factory and stored in memory 206. According to another embodiment, the predetermined run time can comprise a time selected by a user via a user interface, such as user interface 131 of the roller shade 100 or via the setup application running on a user communication device in communication with the motor control module 112. The selected time can then be stored as the predetermined run time in memory 206 and used to determine the rotational speed of the motor 114.

According to another aspect of the embodiments, each motor 114 can report its determined run time (as determined in step 310) such that the determined run time of one shade can be set as the predetermined run time of another shade. For example, referring to FIG. 4, a first roller shade 100*a* may be first operated per steps 302-310 to determine the actual run time of the first roller shade 100*a* without performing steps 312-314. During that process, for example between steps 306 and 308, the user may adjust the speed of the first roller shade 100*a* to a desired speed to have the shade open or close at a faster or slower rate, which will vary the actual run time determined in step 310 and dictate the speed of the remainder of the shades in the room. The rotational speed of the first roller shade 100*a* is not adjusted for that shade such that the first roller shade 100*a* operates according to the run time determined in step 310. The determined run time can be outputted to the setup application running on the user communication device in communication with the roller shade 100*a*. The user can set the determined run time of the first roller shade 100*a* as the predetermined run time of the second roller shade 100*b* such that both shades operate at substantially same run time. According to another embodiment, the first roller shade 100*a* can be set as a master roller shade and can automatically communicate its run time determined in step 310 to the other shades set as slave shades and grouped with the first roller shade 100*a*, for example to roller shade 100*b*, via communication interface 209. The slave shades receiving the run time of the master roller shade, may determine their rotational speed using the received run time. The slave shades may follow the steps shown in FIG. 3 and set the received run time as the predetermined run time. For example, a slave shade may perform a full run and determine its run time in step 310. The slave shade then may calculate its rotational speed in step 312 by multiplying its current speed (e.g., its initial rotational speed level) by a fraction of the determined run time divided by the received (predetermined) run time. Accordingly, the remainder of the shade motors in a room can match to the run time of the first roller shade 100*a*.

According to further aspects of the embodiments, the process recited in steps 308 through 314 to determine the rotational speed of the motor 114 may be repeated during the operation and lifetime of the roller shade 100. This enables rotational speed corrections in the field so that the shade 100 is maintained at substantially consistent predetermined run time during its lifetime. Particularly, the actual run time of the motor 114 may be affected over time due to various factors, such as when the motor 114 takes longer to ramp up over time due to increased friction or other environmental factors. To solve this, the motor control module 112 can continuously or periodically adjust the rotational speed of the motor 112 after each full run (up or down) during the life of the product. For example, every time the shade 100 makes a full run in one or each direction, the motor control module 112 may determine a new rotational speed using steps 308-314. According to another embodiment, the motor control module 112 can monitor the run time and determine the rotational speed of the motor 114 every time the shade make a full run, and after a predetermine number of full runs, the motor control module 112 can average the determined rotational speeds and set that averaged rotational speed as the operational speed for the motor 114. In addition, the run time, or the rotational speed of a shade of the plurality of shades, can be adjusted by the user or by the system controller at a later time, for example to have the shades open or close at a faster or slower rate. In response, each roller shade will recalculate its rotational speed by the factor of the selected change.

While the embodiments described above are illustrated with reference to synchronizing a plurality of shades using different fabric rollup diameters but which have substantially similar shade material lengths, as an example, the embodiments described herein may be implemented to synchronize a plurality of roller shades in other types of installations where synchronization is desired. For example, the embodiments described herein may be used to synchronize a plurality of shades of different lengths and/or shades installed at different heights. Referring to FIG. 5, there is shown a front view of a plurality of roller shades 100*c-f* installed in adjacently positioned windows according to an illustrative embodiment. Exemplary shades 100*c-f* have different lengths and are installed in windows at different heights. According to one embodiment, each roller shade 100*c-f* may be set up according to the steps in FIG. 3 to determine the rotational speed of each shade motor 114 such that the shades 100*c-f* open or close for the same predetermined run time. Accordingly, longer roller shade 100*c* will operate at a faster speed than shorter shaded 100*d-f*. While the hem bars 110 in such an implementation may not track due to the different shade material lengths and positions, the plurality of shades 100*c-f* will start and stop opening or closing the window at substantially the same time.

According to another embodiment, time delays may be introduced to an installation, similar to the one illustrated in FIG. 5, to achieve hem bar tracking. For example, referring to roller shades 100*c-d*, a time delay $T_1$ may be introduced in operation of roller shade 100*d* in an installation where their lower limits 402*c* and 402*d* are substantially aligned but where their upper limits 401*c* and 401*d* are offset, such that the upper limit 401*c* of roller shade 100*c* is higher than the upper limit 401*d* of roller shade 100*d*. In such an implementation, during closing operation it is desired that the hem bar 110 of the taller roller shade 100*c* will start moving down first, while the hem bar 110 of the shorter roller shade 100*d* remains stationary for the period of the time delay $T_1$. When the hem bar 110 of the taller roller shade 100*c* reaches an intermediate limit 501, where it is substantially aligned with the upper limit 401*d* of the shorter roller shade 100*d*, the roller shade 100*d* will then start closing and moving its hem bar 110 to a closed position. Thus, from the intermediate limit 501 of roller shade 100*c* and the upper limit 401*d* of roller shade 100*d*, their hem bars 110 will move substantially in unison and track until reaching the lower limits 402*c-d*. During an open operation, roller shades 100*c-d* will start raising the shade material 106 and hem bars 110 at the same time. When the hem bar 110 of the shorter roller shade 100*d* reaches the upper limit, it will stop, while the hem bar 110 of the taller roller shade 100*c* will continue to move to its upper limit 401*c*.

In such an implementation, the controller 201 of the shorter roller shade 100*d* may store a time delay $T_1$. Time delay $T_1$ may be inputted by the user using a user interface or determined by the controllers 201 of the roller shades 100*c-d* from various factors. For example, the user may measure the distance between the intermediate limit 501 and the upper limit 401*c* of the taller roller shade 100*c* and input that information into the setup application on a user communication device. Based on the measured distance, the setup application or the roller shade controllers 201 may determine the time delay $T_1$. Using the time delay $T_1$, the roller shades 100*c-d* may determine their rotational speed to track the hem bars 110. For example, the controller 201 of the taller roller shade 100*c* may determine the rotational speed of its motor 114 during a predetermined run time to raise or lower the shade material 106 between the upper limit 401*c* and lower limit 402*c*. On the other hand, the controller 201 of the shorter roller shade 100*d* may determine the rotational speed of its motor 114 during a delayed run time comprising the predetermined run time minus the time delay $T_1$ to raise or lower the shade material 106 between the upper limit 401*d* and lower limit 402*d*. This can be also calculated in reverse, where the rotational speed of roller shades 100*c-d* can be determined such that roller shade 100*d* operates between its upper and lower limit 401*d* and 402*d* during a predetermined run time, and roller shade 100*c* operates between its upper and lower limits 401*c* and 402*c* during a run time comprising the predetermined run time plus the time delay $T_1$.

According to another embodiment, instead of inputting a time delay $T_1$ or measurements, the user may lower or raise the hem bar 110 of roller shade 100*c* via a user interface to a position where it is aligned with the upper limit 401*d* of roller shade 100*d* and set that position to the intermediate limit 501. Using the intermediate limit 501, roller shades 100*c-d* may determine the rotational speed, and consequently the delay, to track the hem bars 110. For example, the controller 201 of the shorter roller shade 100*d* may determine the rotational speed of its motor 114 during a predetermined run time to raise or lower the shade material between the upper limit 401*d* and lower limit 402*d*. On the other hand, the controller 201 of the taller roller shade 100*c* may determine the rotational speed of its motor 114 during the predetermined run time to raise or lower the shade material between the intermediate limit 501 and lower limit 402*c*.

The above embodiment to determine rotational speeds can be similarly applied to roller shades 100*c* and 100*e* using time delay $T_2$ and/or intermediate position 502 in an installation where the shade's upper limits 401*c* and 401*e* are substantially aligned but their lower limits 402*c* and 402*e* are offset, such that the lower limit 402*c* of the taller roller shade 100*c* is lower than the lower limit 402*e* of the shorter roller shade 100*e*. In such an implementation, during closing operation, roller shades 100*c-e* will start lowering the shade material 106 and hem bars 110 at the same time. When the hem bar 110 of the shorter roller shade 100*e* reaches its lower limit 402*e*, it will stop, while the hem bar 110 of the taller roller shade 100*c* will continue to move to its lower limit 402*c*. Similarly, during the open operation, the hem bar 110 of the taller roller shade 100*c* will start moving up first, while the hem bar 110 of the shorter roller shade 100*e* remains stationary for the period of the time delay $T_2$. When the hem bar 110 of the taller roller shade 100*c* reaches the intermediate limit 502, where it is substantially aligned with the lower limit 402*e* of the shorter roller shade 100*e*, the shorter roller shade 100*e* will start opening and moving its hem bar 110 to an opened position. From the intermediate limit 502 of the taller roller shade 100*c* and the lower limit 402*e* of the shorter roller shade 100*e*, their hem bars 110 will move substantially in unison and track until reaching their upper limits 401*c-e*. The rotational speed of roller shades 100*c* and 100*e* can be determined such that roller shade 100*c* operates between its upper and lower limit 401*c* and 402*c* during a predetermined run time, and roller shade 100*e* operates between its upper and lower limits 401*e* and 402*e* during a run time comprising the predetermined run time minus time delay $T_2$.

For roller shades without any aligned lower and upper edges, such as roller shade 100*c* and roller shade 100*f* shown in FIG. 5, multiple time delays (e.g., $T_1$ and $T_2$) and intermediate limits (e.g., 501 and 501) may be used. The rotational speeds of roller shades 100*c* and 100*f* can be determined such that roller shade 100*c* operates between its upper and lower limit 401*c* and 402*c* during a predetermined run time, and roller shade 100*f* operates between its upper and lower limits 401*f* and 402*f* during a run time comprising the predetermined run time minus the first time delay $T_1$ and the second time delay $T_2$.

According to a further embodiment, to enable hem bar alignment when the shades are not starting to move from fully opened or fully closed positions, or directing the shades to open or closed to a selected position instead of a full open or close positions, virtual position parameters may be instead implemented in the operation of the roller shades. For example, referring to roller shades 100*c-d* in FIG. 5, controller 201 of the shorter roller shade 100*d* may determine, receive, and/or store an actual position range $AP_1$ of the shade material 106, which may be represented by the number of required revolutions of the motor 114 between the upper limit 401*d* and lower limit 402*d*, by the length of the shade material 106, by distance of travel of the shade material 106, or the like. The controller 201 of the shorter roller shade 100*d* may then use the time delay $T_1$ and the determined rotational speed to determine a virtual position range $VP_1$ that it needs to compensate for to match to the shade material length of the longer roller shade 100*c*. According to another embodiment, the controller 201 of the shorter roller shade 100*d* may receive the actual position range $AP_2$ of the shade material 106 of the longer roller shade 100*c* from the controller 201 of the longer roller shade 100*c* and subtract its actual position range $AP_1$ from the received actual position range $AP_2$ to determine the virtual position range $VP_1$. The controller 201 will append the virtual position range $VP_1$ to its actual position range $AP_1$ to match the position of its shade material 106 to the position of the shade material 106 of the larger roller shade 100*c*. For shorter roller shade 100*d*, the virtual position range $AP_1$ will be appended at the top of the actual position range $AP_1$. However, for shorter roller shade 100*e*, a virtual position range will be appended at the bottom of the actual position range for roller shade 100*e*, while multiple virtual position ranges can be appended at the top and bottom of actual position range of roller shade 100*f* to match to the actual position range $AP_2$ of the longer roller shade 100*c*.

Referring back to shades 100*c-d*, during operation, if the controller 201 of the shorter roller shade 100*d* receives a selected position that falls within the virtual position range $VP_1$, the controller 201 of the shorter roller shade 100*d* will virtually track the position of the shade material 106 within the virtual position range $VP_1$, but not move the shade material 106. The shade material 106 of the longer roller shade 100*c* may however travel within its actual position range $AP_2$. The shade material 106 of the shorter roller shade 100*d* will remain static until the tracked position crosses into the actual position range $AP_1$. If the controller 201 of the shorter roller shade 100*d* receives a selected position that falls within the actual position range $AP_1$, the controller 201 of the shorter roller shade 100*d* will actively track the position of the shade material 106 within the actual position range $AP_1$ and move the shade material 106 to the selected position. Accordingly, the hem bars 110 of roller shades 100*c* and 100*d* will move substantially uniformly up and down to the selected position. Same methodology can be applied to the operation of shades at other positions, such as shades 100*e* and 100*f*.

The embodiments recited herein may also be implemented to synchronize a plurality of motors utilized in other types of shading systems. For example, the embodiments recited herein may be implemented to synchronize two oppositely disposed motors, such as in a skylight type shade, where two roller shades are disposed on opposite ends of a window opening such that the shade material opens symmetrically from a center of the window opening. According to a further embodiment the embodiments recited herein may be further implemented to synchronize two or more motors disposed within a single shade. For example, a large roller shade may contain two motors inserted into each end of the roller tube. To synchronize the motors, one motor may be set as a dominant motor and the second can be set as a slave motor operating at the command of the dominant motor. The dominant motor may determine its rotational speed as discuss herein and set that determined rotational speed as a reference speed for the slave motor.

INDUSTRIAL APPLICABILITY

To solve the aforementioned problems, the aspects of the embodiments are directed towards systems, method, and modes for controlling one or more roller shades in order to substantially synchronize and uniformly align a plurality of roller shades. However, it should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A motorized shade for covering an architectural opening comprising:
- a roller tube;
- a shade material connected to the roller tube;
- a motor adapted to rotate the roller tube;
- a memory comprising a first rotational speed, a set run time, an upper limit position where the shade material is in a raised position, and a lower limit position where the shade material is in a lowered position; and
- a controller in electrical communication with the memory and the motor, wherein the controller:
  - drives the motor at the first rotational speed to perform a full run between the upper limit position and the lower limit position;
  - determines a first run time it took the motor to perform the full run at the first rotational speed;
  - using the first rotational speed and the first run time, determines a second rotational speed for the controller to drive the motor between the upper limit position and the lower limit position within the set run time; and
  - sets the motor to operate according to the second rotational speed.

2. The motorized shade according to claim 1, wherein the controller comprises a position detector that determines a position of the motor.

3. The motorized shade according to claim 2, wherein the position detector comprises a position feedback sensor.

4. The motorized shade according to claim 2, wherein the position detector comprises a motor control circuit adapted to estimate the position of the motor using voltage generated by the motor.

5. The motorized shade according to claim 1, wherein the controller receives the upper limit position and the lower limit position from a user interface.

6. The motorized shade according to claim 1, wherein the controller drives the motor to perform the full run while lowering the shade material from the upper limit position to the lower limit position.

7. The motorized shade according to claim 6, wherein the controller sets the motor to operate according to the second rotational speed when the motor is directed to lower the shade material.

8. The motorized shade according to claim 7, wherein the controller further sets the motor to operate according to the second rotational speed when the motor is directed to raise the shade material.

9. The motorized shade according to claim 7, wherein the controller further:
- drives the motor at the first rotational speed to perform a second full run while raising the shade material from the lower limit position to the upper limit position;
- determines a second run time it took the motor to perform the second full run at the first rotational speed;
- using the first rotational speed and the second run time, determines a third rotational speed for the controller to drive the motor from the lower limit position to the upper limit position within the set run time; and
- sets the motor to operate according to the third rotational speed when the motor is directed to raise the shade material.

10. The motorized shade according to claim 1, wherein the controller drives the motor to perform the full run while raising the shade material and sets the motor to operate according to the second rotational speed when the motor is directed to raise the shade material.

11. The motorized shade according to claim 10, wherein the controller further sets the motor to operate according to the second rotational speed when the motor is directed to lower the shade material.

12. The motorized shade according to claim 1, wherein the controller determines the second rotational speed for raising the shade material within the set run time and a different third rotational speed for lowering the shade material within the set run time.

13. The motorized shade according to claim 1, wherein the controller receives the set run time from a user interface and stores the set run time in the memory.

14. The motorized shade according to claim 1, wherein the set run time is preset and stored in the memory of the motorized shade.

15. The motorized shade according to claim 1, wherein during operation and after each full run of the shade material between the upper limit position and the lower limit position, the controller determines an updated rotational speed within the set run time and sets the motor to operate according to the updated rotational speed.

16. The motorized shade according to claim 1, wherein during operation and after each full run of the shade material between the upper limit position and the lower limit position, the controller determines an updated rotational speed within the set run time, wherein after a predetermined number of full runs the controller determines an averaged rotational speed from the determined updated rotational speeds and sets the motor to operate according to the averaged rotational speed.

17. The motorized shade according to claim 1, wherein the controller determines the second rotational speed using the following formula:

$$RPM2=(T1*RPM1)/T2$$

where,

RPM1 is the first rotational speed,

RPM2 is the second rotational speed,

T1 is the first run time; and

T2 is the set run time.

18. A system for aligning a plurality of motorized shades comprising:

a first shade and a second shade, each comprising:

a roller tube;

a shade material connected to the roller tube;

a motor adapted to rotate the roller tube;

a memory comprising an initial rotational speed, a set run time, an upper limit position where the shade material is in a raised position, and a lower limit position where the shade material is in a lowered position, wherein the set run time of the first shade and the second shade are the same; and a controller in electrical communication with the memory and the motor;

wherein the controller of the first shade:

drives the motor of the first shade at the initial rotational speed to perform a first full run between the upper limit position and the lower limit position of the first shade;

determines a first run time it took the motor of the first shade to perform the first full run at the initial rotational speed;

determines a first rotational speed as a function of the initial rotational speed, the first run time, and the set run time; and sets the motor of the first shade to operate according to the first rotational speed;

wherein the controller of the second shade:

drives the motor of the second shade at the initial rotational speed to perform a second full run between the upper limit position and the lower limit position of the second shade;

determines a second run time it took the motor of the second shade to perform the second full run at the initial rotational speed;

determines a second rotational speed as a function of the initial rotational speed, the second run time, and the set run time; and sets the motor of the second shade to operate according to the second rotational speed.

19. The system according to claim 18, wherein the first rotational speed of the first shade is different than the second rotational speed of the second shade.

20. A system for aligning a plurality of motorized shades comprising:

a first shade and a second shade, each comprising a roller tube, a shade material connected to the roller tube, a motor adapted to rotate the roller tube, a memory, and a controller adapted to control the motor, wherein the memory of each first and second shades comprises a first rotational speed, an upper limit position where the shade material is in a raised position, and a lower limit position where the shade material is in a lowered position;

wherein the controller of the first shade operates according to the first rotational speed and:

drives the motor of the first shade at the first rotational speed to perform a first full run between the upper limit position and the lower limit position of the first shade;

determines a first run time it took the motor of the first shade to perform the first full run at the first rotational speed; and transmits the first run time;

wherein the controller of the second shade:

receives the first run time;

drives the motor of the second shade at the first rotational speed to perform a second full run between the upper limit position and the lower limit position of the second shade;

determines a second run time it took the motor of the second shade to perform the second full run at the first rotational speed;

determines a second rotational speed as a function of the first rotational speed, the second run time, and the first run time; and sets the motor of the second shade to operate according to the second rotational speed.

21. The system according to claim 20, wherein the first rotational speed is set based on an input receive from a user interface.

22. The system according to claim 20, wherein the first rotational speed is preset and stored in the memory of the first shade.

23. The system according to claim 20, wherein the first shade transmits the first run time to the second shade.

24. The system according to claim 20, wherein the first shade transmits the first run time to a system control processor, and wherein the system control processor transmits the first run to the second shade.

25. A motorized shade for covering an architectural opening comprising:

a roller tube;

a shade material connected to the roller tube;

a motor adapted to rotate the roller tube;

a memory comprising an initial rotational speed, a set run time, an upper limit position where the shade material is in a raised position, and a lower limit position where the shade material is in a lowered position; and a controller in electrical communication with the memory and the motor, wherein the controller:

drives the motor at the initial rotational speed to perform a full run between the upper limit position and the lower limit position;

determines an initial run time it took the motor to perform the full run at the initial rotational speed;

determines an updated rotational speed as a function of the initial rotational speed, the initial run time, and the set run time; and sets the motor to operate according to the updated rotational speed.

* * * * *